United States Patent
Clark

(10) Patent No.: US 11,384,623 B2
(45) Date of Patent: Jul. 12, 2022

(54) SYSTEMS AND METHODS FOR STORING AND EXTRACTING NATURAL GAS FROM UNDERGROUND FORMATIONS AND GENERATING ELECTRICITY

(71) Applicant: Dustin Clark, Drumheller (CA)

(72) Inventor: Dustin Clark, Drumheller (CA)

( * ) Notice: Subject to any disclaimer, the term of this patent is extended or adjusted under 35 U.S.C. 154(b) by 446 days.

(21) Appl. No.: 16/444,521

(22) Filed: Jun. 18, 2019

(65) Prior Publication Data

US 2020/0392815 A1 Dec. 17, 2020

Related U.S. Application Data

(63) Continuation of application No. PCT/IB2019/054835, filed on Jun. 11, 2019.

(51) Int. Cl.
*E21B 41/00* (2006.01)
*B65G 5/00* (2006.01)
*F01K 25/08* (2006.01)
*F02C 6/14* (2006.01)

(52) U.S. Cl.
CPC ............ *E21B 41/0085* (2013.01); *B65G 5/00* (2013.01); *F01K 25/08* (2013.01); *F02C 6/14* (2013.01)

(58) Field of Classification Search
CPC ....... E21B 41/0085; B65G 5/00; F01K 25/08; F02C 6/14
USPC ............. 60/641.2–641.4, 650, 659, 682–684
See application file for complete search history.

(56) References Cited

U.S. PATENT DOCUMENTS

| | | | | |
|---|---|---|---|---|
| 5,685,154 A | * | 11/1997 | Bronicki | F02C 1/00 60/648 |
| 2013/0341924 A1 | * | 12/2013 | Lewis | F01D 15/10 290/52 |
| 2014/0130498 A1 | * | 5/2014 | Randolph | E21B 43/24 60/645 |
| 2014/0174751 A1 | * | 6/2014 | Lugo | E21B 43/01 166/335 |
| 2014/0250912 A1 | * | 9/2014 | Huntington | F01K 17/025 60/783 |
| 2015/0158789 A1 | * | 6/2015 | Keusenkothen | C07C 15/02 60/780 |
| 2015/0376801 A1 | * | 12/2015 | Bairamijamal | F02C 3/20 204/257 |

* cited by examiner

*Primary Examiner* — Hoang M Nguyen
(74) *Attorney, Agent, or Firm* — Lewellyn Law, PLLC; Stephen Lewellyn

(57) ABSTRACT

A method of extracting natural gas from an underground storage formation and has the steps of: (a) recovering natural gas stored in a first underground formation at a first pressure to the ground surface and forming a first natural gas flow; (b) separating liquid from the first natural gas flow and forming second natural gas flow; (c) heating said second natural gas flow to form a heated, third natural gas flow having a sufficient temperature to prevent hydrate formation when the third gas flow is expanded to a second pressure that is lower than the first pressure; and (d) expanding the third natural gas flow across an expansion turbine to generate electricity and form a fourth natural gas flow having the second pressure.

1 Claim, 13 Drawing Sheets

SYSTEMS AND METHODS FOR STORING AND EXTRACTING NATURAL GAS FROM UNDERGROUND FORMATIONS AND GENERATING ELECTRICITY

CROSS-REFERENCE TO RELATED APPLICATIONS

This application claims the benefit of PCT Application Ser. No. PCT/IB2019/054835, filed Jun. 11, 2019.

FIELD OF THE INVENTION

The present invention relates to storing natural gas within underground formations and generating electricity during recovery of the natural gas from the formations with reduced greenhouse gas emissions.

BACKGROUND OF THE INVENTION

When natural gas production is higher than its consumption, the excess production is often stored in underground formations, such as depleted oil and natural gas formations, salt caverns, and depleted aquifers. When natural gas production is lower than consumption, it can be withdrawn from storage to meet demand.

When the natural gas is injected into an underground formation for storing, the pressure builds as more natural gas is added. In this sense, the formation becomes a sort of pressurized natural gas storage container. This pressure is later used to withdraw or extract the natural gas from the formation as needed. Often the pressure of the natural gas withdrawn from the formation is higher than the pressure of the pipelines that are used to transport the natural gas from storage. This requires lowering the pressure of the withdrawn gas before for transport. The energy lost by reducing the gas pressure is considered a waste energy and is not used.

SUMMARY OF THE INVENTION

Embodiments of the invention provide systems and methods of natural gas storage in underground formations that utilized the waste energy produced by gas expansion in conventional natural gas storage facilities to generate electricity.

An object of embodiments of the present invention is to provide systems for storing natural gas within one or more underground formations that generate electricity.

Another object of embodiments of the present invention is to provide methods of operating systems for storing natural gas within one or more underground formations that generate electricity.

In general, in one aspect, a method of extracting natural gas from an underground storage formation and generating electricity is provided. The method has the steps of: (a) recovering natural gas stored in a first underground formation at a first pressure to the ground surface and forming a first natural gas flow; (b) separating liquid from the first natural gas flow and forming second natural gas flow; (c) heating said second natural gas flow to form a heated, third natural gas flow having a sufficient temperature to prevent hydrate formation when the third gas flow is expanded to a second pressure that is lower than the first pressure; and (d) expanding the third natural gas flow across an expansion turbine to generate electricity and form a fourth natural gas flow having the second pressure.

In general, in another aspect, a method of generating electricity using natural gas stored within underground formations is provided. The method has the steps of: (a) providing natural gas underground storage comprising of at least three separate, nonconducting underground formations, with a first formation having a first formation pressure, a second formation having a second formation pressure, and a third formation having a third formation pressure, the first formation pressure being higher than the second formation pressure, and the second formation pressure being higher than the third formation pressure; (b) recovering natural gas stored in the first underground formation forming a first natural gas flow; (c) expanding the first natural gas flow across expansion turbine to generate electricity and forming a second natural gas flow having pressure lower than the pressure of the first natural gas flow; (d) injecting the second natural gas flow into the second underground formation through a first wellbore run therein; (e) recovering natural gas stored in the second underground formation through a second wellbore run therein forming a third natural gas flow; (f) expanding the third natural gas flow across expansion turbine to generate electricity and forming a fourth natural gas flow having pressure lower than the pressure of the third natural gas flow; and (g) injecting the fourth natural gas flow into the third underground formation through a third wellbore run therein.

In general, in another aspect, a method of storing natural gas in an underground formation and generating electricity is provided. The method has the steps of: (a) receiving a first flow natural gas from a sales point, the first flow of natural gas having a first pressure; (b) expanding the first natural gas flow across an expansion turbine to generate electricity and form a second natural gas flow having the second pressure; and (d) injecting said second natural gas flow into an underground formation having a formation pressure that is lower than the second pressure.

Numerous objects, features and advantages of the present invention will be readily apparent to those of ordinary skill in the art upon a reading of the following detailed description of presently preferred, but nonetheless illustrative, embodiments of the present invention when taken in conjunction with the accompanying drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

For a better understanding of the invention, its operating advantages and the specific objects attained by its uses, reference should be had to the accompanying drawings and descriptive matter in which there are illustrated embodiments of the invention.

BRIEF DESCRIPTION OF THE DRAWINGS

The following drawings illustrate by way of example and are included to provide further understanding of the invention for the purpose of illustrative discussion of the embodiments of the invention. No attempt is made to show structural details of the embodiments in more detail than is necessary for a fundamental understanding of the invention, the description taken with the drawings making apparent to those skilled in the art how the several forms of the invention may be embodied in practice. Identical reference numerals do not necessarily indicate an identical structure. Rather, the same reference numeral may be used to indicate a similar feature of a feature with similar functionality. In the drawings.

DETAILED DESCRIPTION OF THE INVENTION

Figure 1:
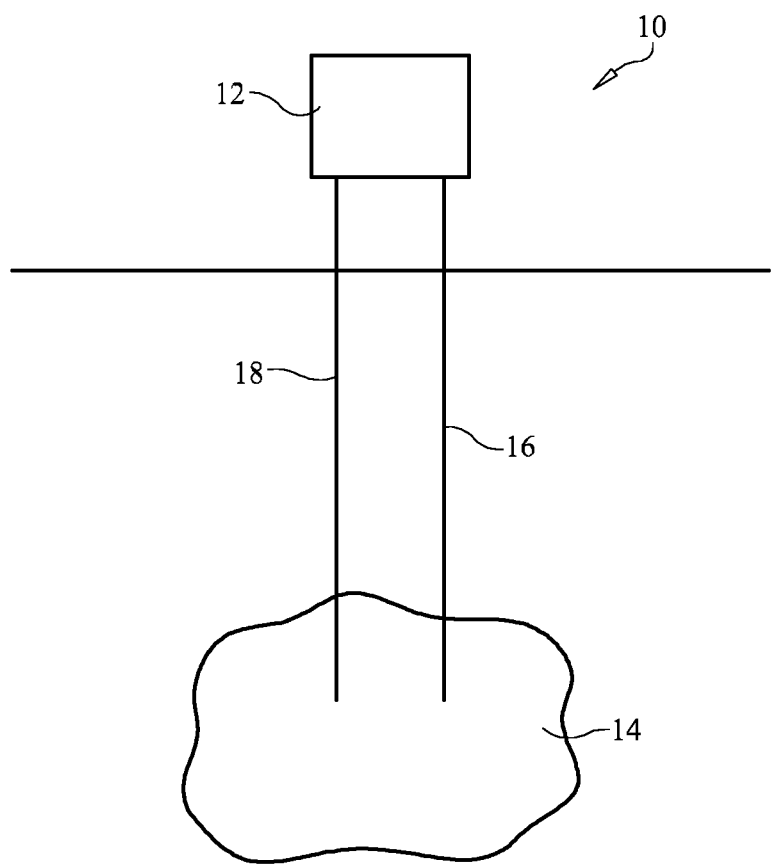
FIG. 1 is a diagrammatic illustration of a system constructed in accordance with an embodiment of the invention.

In FIG. 1 there is diagrammatically shown a system 10 including an equipment plant 12, an underground formation 14, an injection well 16 run into the underground formation and connected to the equipment plant, and a recovery well 18 run into the underground formation and connected to the equipment plant. Formation 14 can be a depleted oil and natural gas formation, a salt cavern, or a depleted aquifer. It will become understood, that system 10 and methods of operating the same provide for the storage of natural gas in formation 14 and the generation of electricity with little to no greenhouse gas emissions. System 10 can be used to construct new natural gas storage facilities or can be used to convert existing natural gas storage facilities.

This is the basic field set up of the hydrocarbon formation/ salt cavern used to store compressed methane. Though the configurations may vary, the concept will remain similar amongst facilities. A well drilled into the formation, whether it be horizontal or vertical, is to be used to transfer the natural gas into the underground storage reservoir. Generally, the facilities will have a main hand valve at the well to allow for isolation. There will be pressure, temperature and flow transmitters. Pneumatic controllers will be employed to actuate valves. Transducers will convert the pneumatic signals into electric signals for transmission back to plant PLC to enable remote control capabilities. In some configurations, dehydration can take place in the field at the well pad location. Pigging facilities will be located at the pipeline for dewatering and pipeline maintenance. The well pad sites may range from single wells to multiple, depending on the formation. There may be single or multiple pipelines connecting the plant to the wells. In some configurations, formation wells may be on the plant site itself, negating the need for pipelines.

Figure 2:
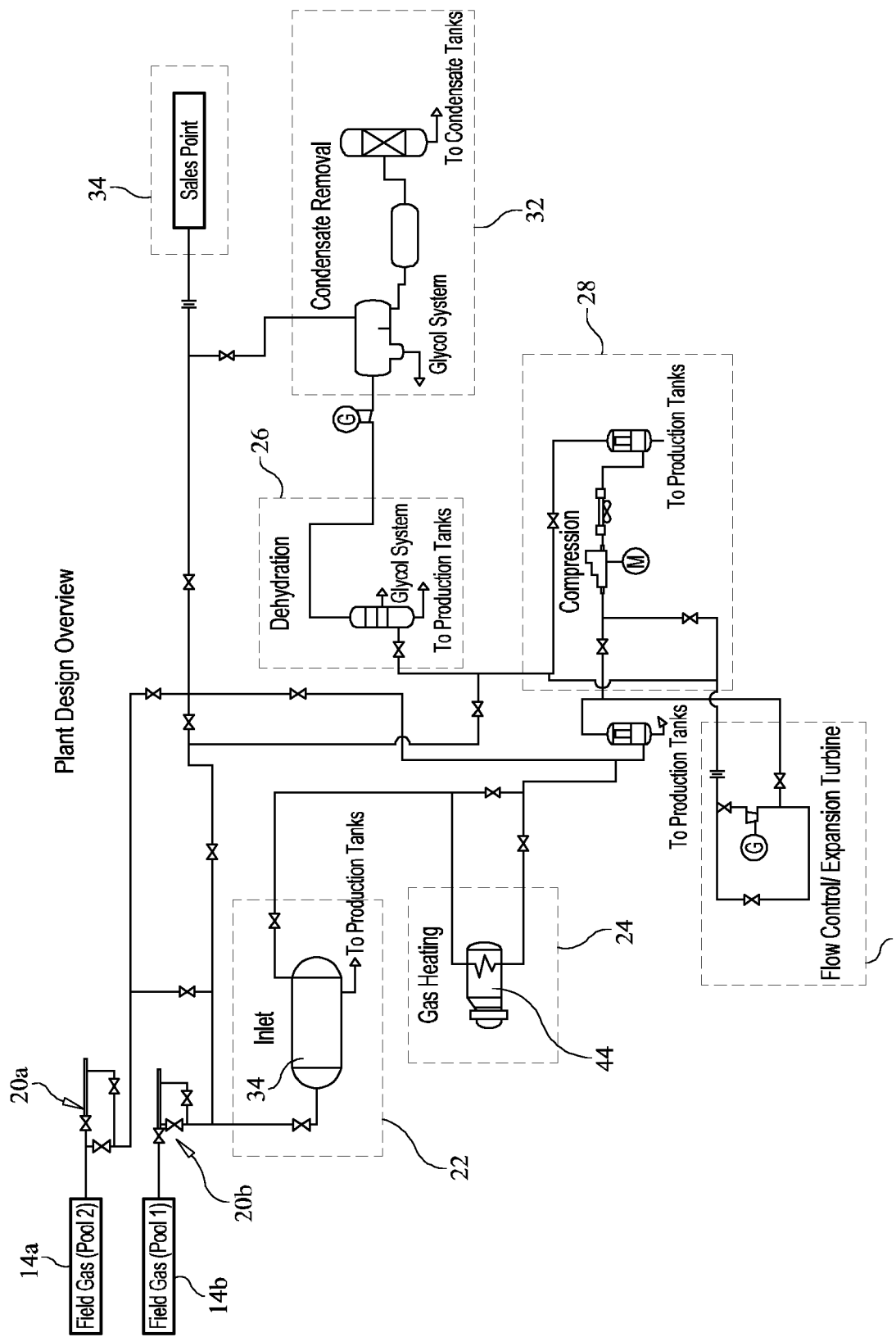
FIG. 2 is a schematic diagram of equipment plant with an exemplary construction in accordance with an embodiment of the invention.

In FIG. 2 there is shown a schematic diagram of equipment plant 12 with an exemplary construction. Equipment plant 12 may take on many different specific arrangements of various equipment forming the plant, as will be readily recognized by one of ordinary skill in the field of this disclosure. In the exemplary configuration shown in FIG. 2, the equipment plant 12 includes at least one connection to a formation to inject and withdraw natural gas from the formation, which is representatively shown here as connection 20a to a first formation 14a and connection 20b to a second formation 14b. The equipment plant 12 further includes gas/liquid separation equipment 22, gas heating equipment 24, gas dehydration equipment 26, gas compression equipment 28, electricity generating equipment 30, condensate removing equipment 32, and sales point equipment 34. The various equipment forming the equipment plant 12 are operatively connected by piping and flow control valves that are operable to direct the flow of natural gas through the equipment of the plant.

Figure 3:
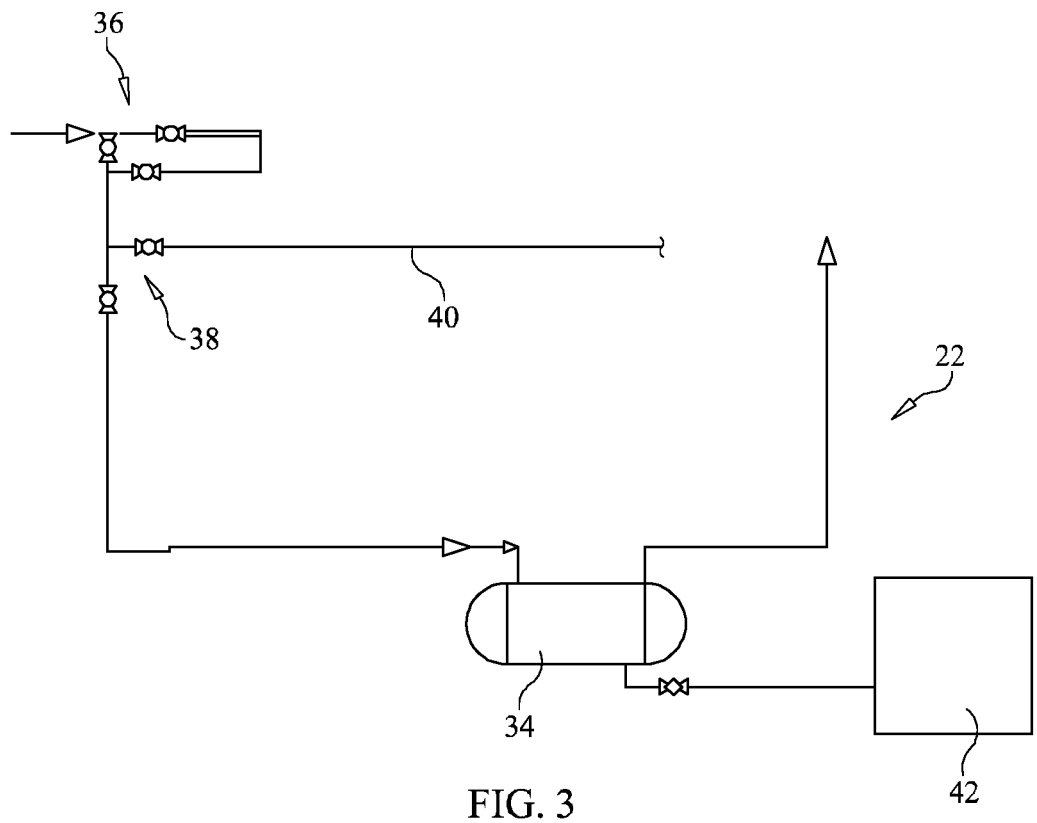
FIG. 3 is a schematic diagram showing an example configuration of gas/liquid separation equipment in accordance with an embodiment of the invention.

In FIG. 3 there is a schematic diagram showing an example configuration of gas/liquid separation equipment 22. As shown, there is a gas/liquid separator 34 that is connected to separate liquid from the natural gas coming into the plant 12. The separator 34 can be of any separators now know or developed in the future.

With continued reference to FIG. 3, the term inlet encompasses the facility equipment close to where the pipelines enter the facility. Pigging facilities 36 will be installed for the purposes of dewatering pipelines and other maintenance concerns. Bypass piping and corresponding valves 38 will be installed for sending natural gas out to the pipeline 40. Configurations will vary depending on the number of pipelines, but all piping for incoming reservoir natural gas will need to be configured in such a way that the natural gas travels through separator 34. Inversely, the piping will be arranged so outgoing natural gas will be able to travel to the intended reservoir, through pipelines. All pipeline and plant piping will have isolation valves in accordance with regulations. Separation of the liquids out of the natural gas stream can be achieved from various configurations employing a variety of different pressure vessels. Horizontal and vertical separators are common. Demister plates, vane packs and cyclone separation can all be employed to aid in the recovery of liquids from the gas stream. Liquids are collected in the bottom of these vessels, sometimes in a 'boot configuration'. That liquid is dumped to a storage tank 42. This liquid can then be disposed of or sold. Pressure, level, flow and temperature transmitters will be prevalent throughout the inlet piping and separation pressure vessels. Transducers will convert these signals to electric for transmission to plant PLC. This allows remote monitoring and control from a main plant PLC. Most valves will be actuated by instrument air and controlled remotely form plant PLC. Some isolation valves may remain hand operated.

Figure 4:
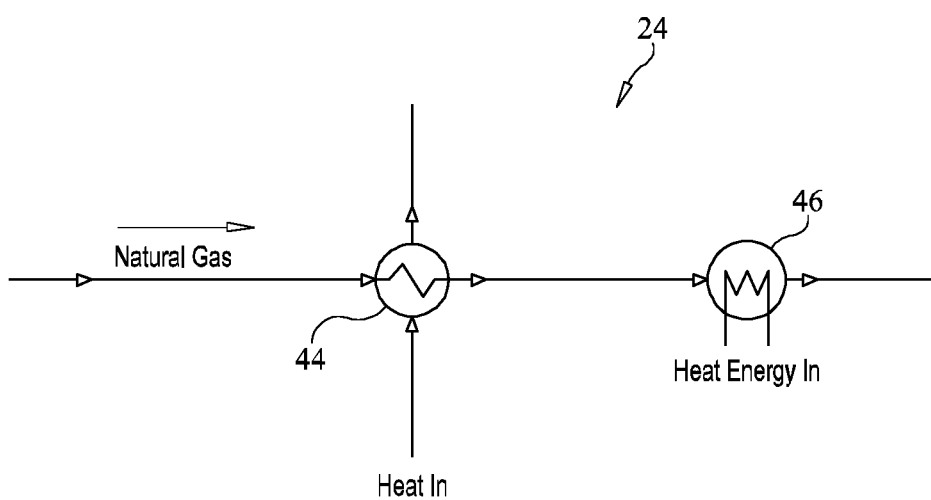
FIG. 4 is a schematic diagram showing an example configuration of the natural gas heating equipment in accordance with an embodiment of the invention.

In FIG. 4 there is a schematic diagram showing an example configuration of the natural gas heating equipment 24. Configurations may vary but the in all systems the temperature of the natural gas must be increased prior to expansion across the electrical generator, discussed below, as the loss of pressure creates a temperature drop and hydrate formation must be avoided. This can be accomplished by several methods. Any waste heat generated can be exchanged with the natural gas stream through a tube and shell type exchanger 44. An example would be the heat energy generated during compression, as discussed below. Indirect heating methods are most common. Line heaters 46 with a firetube, gas tubes and liquid bath to exchange heat energy. These use natural gas as a fuel to increase the temperature of the gas. Gas and bath temperatures are monitored, and heat energy is added as needed. Temperature and pressure transmitters will be transduced to electric signals for transmission to main plant PLC. This enables remote monitoring and control capabilities. One of ordinary skill in the art would readily understand that other configurations could be used in place of the representatively depicted gas heating equipment arrangement while remaining within the scope of the invention.

Figure 5:
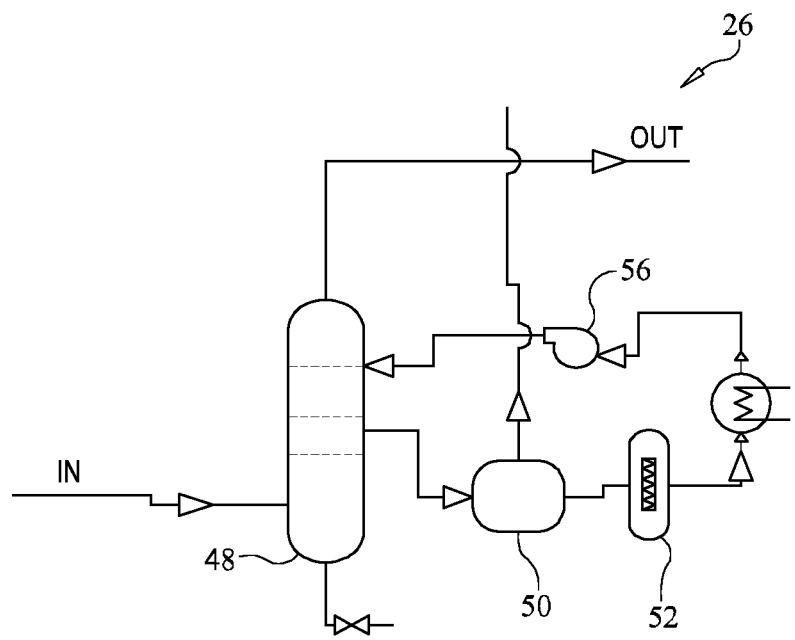
FIG. 5 is a schematic diagram showing an example configuration of the natural gas dehydration equipment in accordance with an embodiment of the invention.

In FIG. 5 there is a schematic diagram showing an example configuration of the natural gas dehydration equipment 26. The dehydration component of the system and methods herein is needed for both the generation of electrical energy and sale of natural gas. Removing the water vapor from the natural gas can be accomplish by glycol dehydration, for example. Any dehydration system now known or developed in the future may be used in the systems and methods described herein. The configuration of the dehydration system in not important to the operation of the system. One of ordinary skill in the art would readily understand that other configurations could be used in place of the representatively depicted dehydration equipment arrangement while remaining within the scope of the invention.

With continued reference to FIG. 5, in an exemplary dehydration system 26, such as, for example a glycol dehydration system where natural gas flows through a glycol vessel 48 any liquids should drop out into the bottom of the vessel and be dumped off to a storage tank (not shown). The gas flows upwards through trays of glycol. The water vapor becomes entrained in the glycol and the natural gas flows out the top of the vessel dehydrated or dry. The saturated glycol flows downward and is dumped off into a flash tank 50. This flash tank allows the break out of any natural gas that flashes off as it is de-pressured, and this flash gas is sent to an incinerator. This flash gas can also be used as fuel gas for the Glycol Regeneration boiler. The glycol passes from the flash tank to a filter separator 52 and then into a reboiler 54. Natural Gas is used as fuel gas to heat the glycol and boil off any water entrained in the glycol these vessels are called reboilers. This process of boiling the water out of the glycol is called regeneration. The regenerated glycol is now pumped by pump 56 back into the dehydration tower (vessel) in a continuous cycle. The above is an example of a glycol dehydration system. The most commonly used glycol is Tri ethylene glycol.

As previously mentioned, dehydration is only one example system for dehydrating the natural gas. Another form of dehydration is adsorption. Solid-desiccant dehydration is the primary form of dehydrating natural gas using adsorption, and usually consists of two or more adsorption towers, which are filled with a solid desiccant. Typical desiccants include activated alumina or a granular silica gel material. Wet natural gas is passed through these towers, from top to bottom. As the wet gas passes around the particles of desiccant material, water is entrained on the surface of these desiccant particles. Passing through the entire desiccant bed, the water is adsorbed onto the desiccant material, leaving the dry gas to exit out of the tower.

The dehydration system 26 may be placed in other locations, for example, it can be located before or after expansion turbine or flow control. It is generally more cost effective to build dehydration vessels for operating a lower pressure so in most applications the dehydration system 26 will be located down stream of the pressure drop from the expansion turbine or flow control. If the dehydration system 26 is placed upstream of the expansion turbine or flow control, or at the well site, an advantage is eliminating the risk of producing hydrates in the nature gas stream, allowing for lower operating temperatures. In some applications am Amine system could be used to remove hydrogen sulfide gas from the natural gas stream and would be located near the dehydration system 26.

Figure 6:
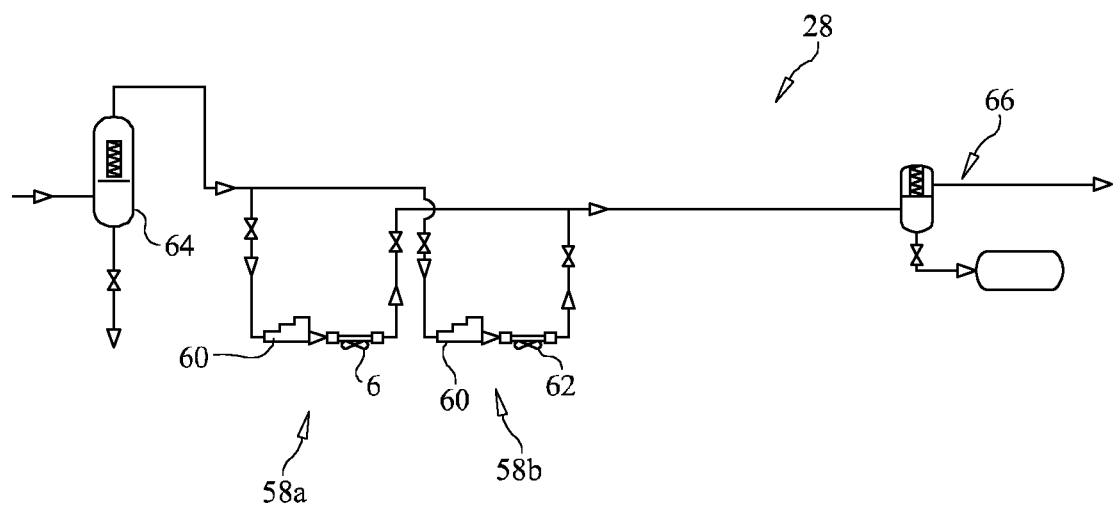
FIG. 6 is a schematic diagram showing an example configuration of the compression equipment in accordance with an embodiment of the invention.

In FIG. 6 there is a schematic diagram showing an example configuration of the compression equipment 28. Compression is an important component of the systems and methods described herein. Compression enables storage of the energy to be converted to electricity and a large quantity of natural gas as a commodity in the underground formation. There can be various embodiments of compression. As shown in this example, there are two compressor banks 58a and 58b, each having a compressor 60, which in most embodiments will be positive displacement compressor, such as rotary or reciprocating compressor. Each compressor bank may also include a means to cool the gas after compression. Accordingly, cooler such as, for example, air coolers 62 may be used, which are the most common means of lowering the temperature of the gas. A filter separator 64 can be employed at the low-pressure suction (inlet) of the compressors. This ensures that the natural gas is clean of particles that might damage the compressor. A tube shell type heat exchanger or other heat exchanger (not shown) can be employed to make use of the waste heat generated as well. This excess heat can be utilized to warm the gas as was illustrated on the heat exchanger drawing. A second gas/liquid separator 66 may employed to capture any lubricating oil in the natural gas stream introduced by the compressors. These compressors can have electric or natural gas driven motors to drive them. In ideal configurations the energy consumed is electric and is generated by system 10. Again, it is important to note the one of ordinary skill in the art would readily understand that other configurations could be used in place of the representatively depicted compression equipment arrangement while remaining within the scope of the invention.

Figure 7:
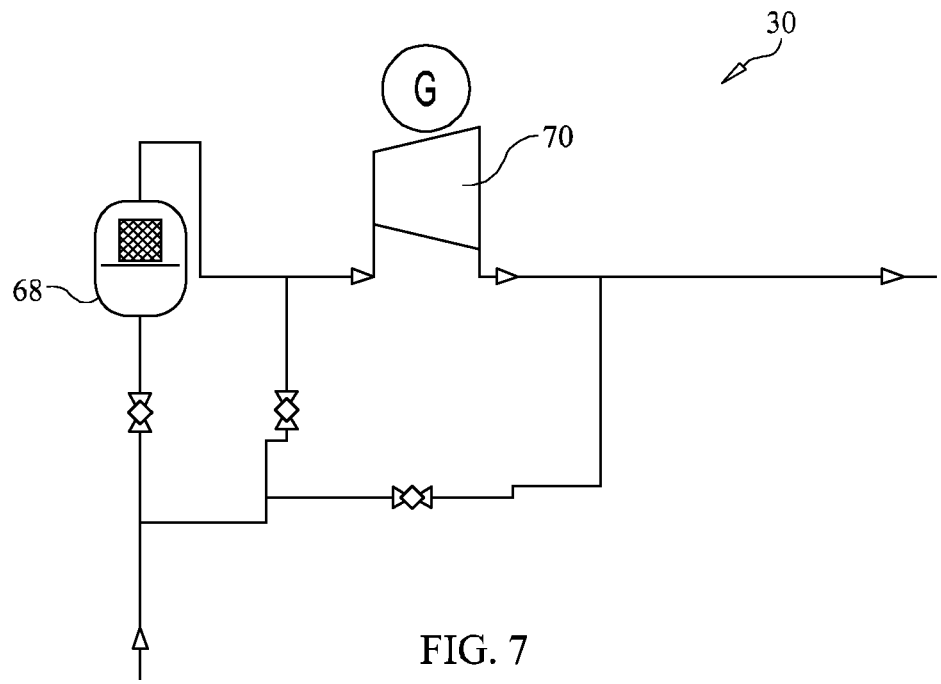
FIG. 7 is a schematic diagram showing an example configuration of the electricity generating equipment in accordance with an embodiment of the invention.

In FIG. 7 there is a schematic diagram showing an example configuration of the electricity generating equipment 30. After being separated and heated, the high-pressure natural gas from the reservoir enters this stage of the system and method. A filter separator 68 should be employed to ensure the gas is free of particles that may damage the expansion turbine. The high-pressure natural gas is expanded across the electric generator 70 to reduce its pressure and the kinetic energy released during gas expansion powers the electric generator to generate electricity. The process of expanding the gas to generate power can be accomplished by various means: Turbo expanders, expansion turbines and back pressure turbines all use the same principle to generate power. This set up shall be configured in such a way that the turbine can be bypassed, and a flow control valve can still be used to control the flow. Pressure, flow, level and temperature transmitters will be employed in various configurations upstream and downstream of the expansion turbine and flow control. All signals will employ electric transducers to communicate with the main plant PLC. This will allow remote monitoring and control. One of ordinary skill in the art would readily understand that other configurations could be used in place of the representatively depicted electric equipment arrangement while remaining within the scope of the invention.

In embodiments, power from a main utility will can be connected to an electrical substation located at the plant. Transformers will drop the voltage from the main utility to a desired voltage. Power will be metered downstream of the main transformer. This high voltage will be used to power the electric compressors. In some configurations where the compressors are not using electric motors, high voltage will not be required for compression. A second transformer can be used to step the voltage down to low voltage, which is required for most of the plant processes. Power generated from the expansion turbines will be metered before it is transformed to the utility voltage and injected into the main utility.

Figure 8:
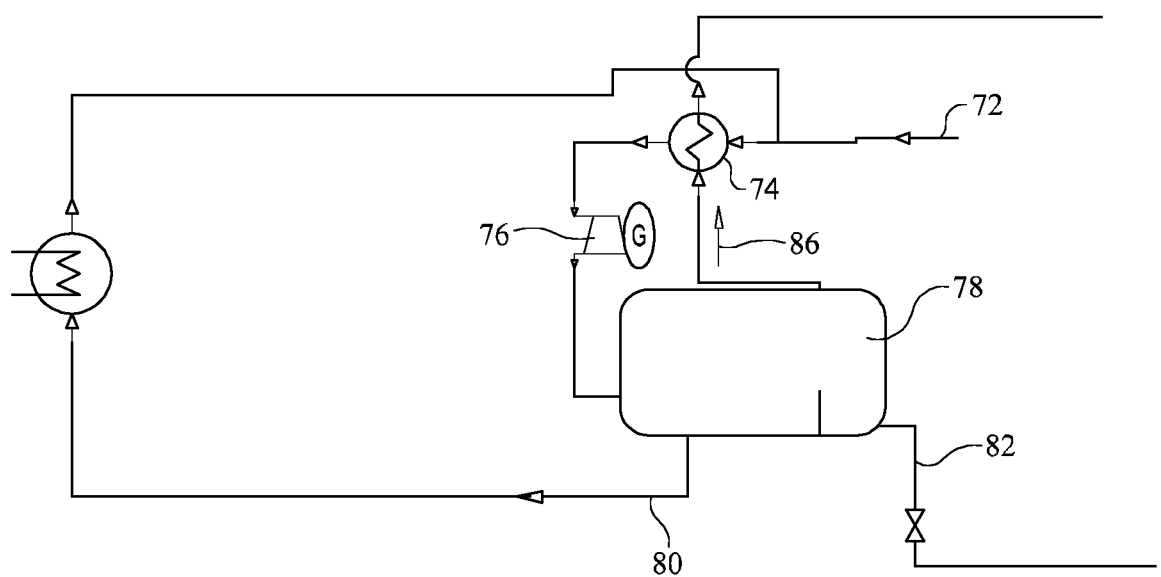
FIG. 8 is a schematic diagram showing an example configuration of the condensate removal equipment in accordance with an embodiment of the invention.

In FIG. 8 there is a schematic diagram showing an example configuration of the condensate removal equipment 32. This component of the system and method functions to remove any natural gas liquids from the gas stream. It can come in two forms: absorption and refrigeration. The depicted arrangement shows a system that lowers the temperature of the natural gas to liquify any of the Natural Gas Liquids (NGLs) such as ethane, propane, butane, isobutane, and pentane. More advanced NGL separation methods can be incorporated into the plant 12 but are out of the scope of the process required for this patent. The warm NGL (condensate) rich gas 72 flows into a heat exchanger 74. The heat exchanger 74 may exchange heat between incoming and outgoing gas, starting the cooling process. Most low temperature separation systems use glycol to remove any water in the natural gas stream.

The glycol may enter the gas flow stream in several points throughout the cooling process, starting before the heat exchanger 74. Some Low temperature separation systems use a refrigeration plant and chiller to cool the gas, some will employ an expansion valve, but the ideal chilling system uses a turbo expander or expansion turbine 76 to generate the chilling effect. This expansion also converts the pressure into electricity as a by-product. After the natural gas has been chilled it enters a 3-phase separator 78. The glycol is heaviest and dumps off the bottom at 80. A weir system is employed to skim the condensate off the top of the glycol and is removed from the separator 80 at 82 and may be stored in storage tanks (not shown). The glycol is sent into a glycol regeneration system to remove any water in a continuous loop. In some configurations 'all plant dehydration' can be achieved through a 3-phase separator and not using dehydration towers. In some embodiments the glycol can be removed from the chilling and low temp separation process as the natural gas may be sufficiently dehydrated prior to entering the low temp separator. Condensate free gas 86 flows out of the separator 78 and across heat exchanger 74. One of ordinary skill in the art would readily understand that other configurations could be used in place of the representatively depicted condensate removal equipment arrangement while remaining within the scope of the invention.

For example, another way to remove natural gas liquids is through absorption. In NGL absorption, an absorbing oil is used. This absorbing oil entrains NGLs. Before the oil has picked up any NGLs, it is described as lean absorption oil. As the natural gas is passed through an absorption tower, it is brought into contact with the absorption oil which soaks up a high proportion of the NGLs. This oil is now described as rich absorption oil, containing NGLs. It exits the absorption tower through the bottom. It is now a mixture of absorption oil, propane, butanes, pentanes, and other heavier hydrocarbons. The rich oil is fed into lean oil stills, where the mixture is heated to a temperature above the boiling point of the NGLs, but below that of the oil. Temperature, flow, level and pressure transmitters will be intermittent among this entire process. All signals will be transduced into electrical signals for remote monitoring and control.

With reference back to FIG. 2, the sales point equipment is located at the custody transfer of the natural gas. It will have flow, temperature and pressure transmitters. Gas analysis is also done in various embodiments. This equipment is required to be precise and will be calibrated frequently. The information that is metered here is the information used to quantify the purchase and sale of natural gas. In most configurations each company involved in the custody transfer will have a metering system and constant comparison and analysis will ensure accuracy.

One of ordinary skill in the art will understand all valves described in the facility can be assumed to be controlled electrically, hydraulically or pneumatically, depending on the embodiment and thus not limited to manual operation. All sensors, motors, generators and meters described are assumed to output electronic signals with the appropriate wired/wireless connections. The control system is a suitable control application such a computer software medium. This control application/program receives/sends the appropriate telemetry to the sensors, motors, generators, meters and valves to allow a for a human/machine interface for the monitoring and control of the facility.

It is important to note all facilities and the equipment within will have appropriate safety devices as dictated by the regional governing body within which the facility resides. Flare systems are used with natural gas facilities to burn off escaping natural gas. Vessels and equipment will have pressure safety valves and blown down valves. Incoming and outgoing valves at plant facilities commonly employ emergency shutdown valves which isolate the energy sources, such as a pipeline, in the case of an emergency. Incorporated into the control system commonly will be a means of fire detection sensors and gas detection sensors to assist in the emergency control systems.

Figure 9:
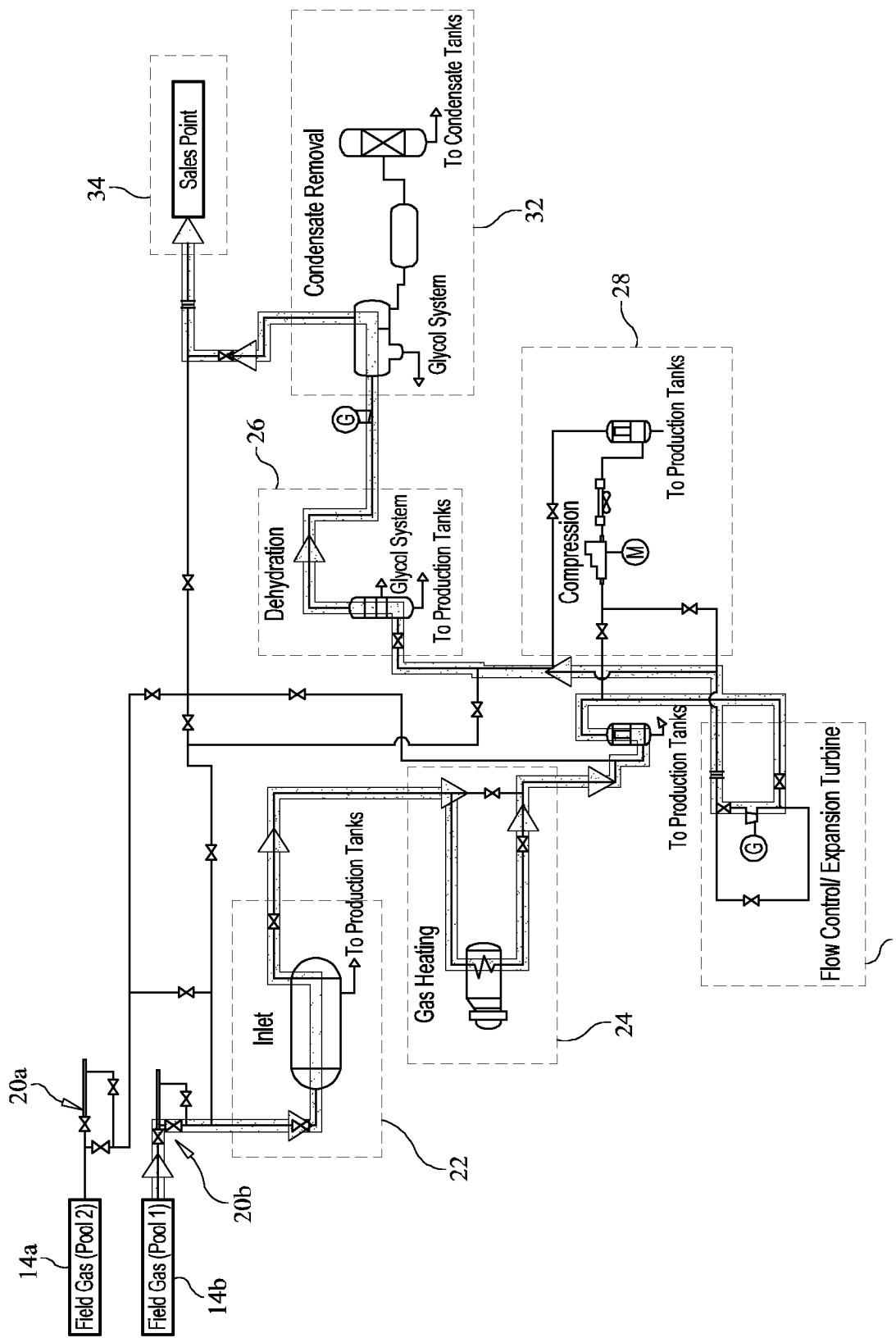
FIG. 9 is a schematic diagram showing a Sales Expansion operating method in accordance with an embodiment of the invention.

Various methods of operating the system 10 can be understand and will now be described. With reference to FIG. 9, a Sales Expansion method of operating the system 10 is schematically shown. This method allows for the sale of natural gas on the commodity market. High pressure gas moves from the underground storage through the plant 12 and is expanded through the turbines, generating power. After the gas has been expanded, dehydrated and processed of hydrocarbons it enters the sales point. This mode allows for both the sale of natural gas and the sale of electricity.

More specifically, natural gas enters the plant 12 from a formation where it is stored at high pressure, for example, from formation 14*b*. The natural gas is then flowed through the gas/liquid separation equipment 22 where the gas is processed to separate fluids from the gas. Separated gas then flows through the gas heating equipment to heat the gas to a sufficient temperature to prevent hydrate from forming when the gas is expanded as it flows through the electric generating equipment. The sufficient temperature is a function of the initial pressure of the gas and the resulting pressure of that gas after it is processed through the electric generating equipment and known thermodynamics.

The heated gas then flows into the electrical generating equipment 30, wherein the gas pressure is reduced by expanding the gas across the electric generator 70. The electricity produced by the electric generator can be stored, used to power components of the equipment plant 12, and/or sent to a power grid for sale. After the electrical generating equipment, the gas flows to the gas dehydration equipment 26 where the gas is dehydrated. The dehydrated gas then flows through the condensate removal equipment 32 to remove any remaining condensate with the gas before being delivered to the sales point 34.

Figure 10:
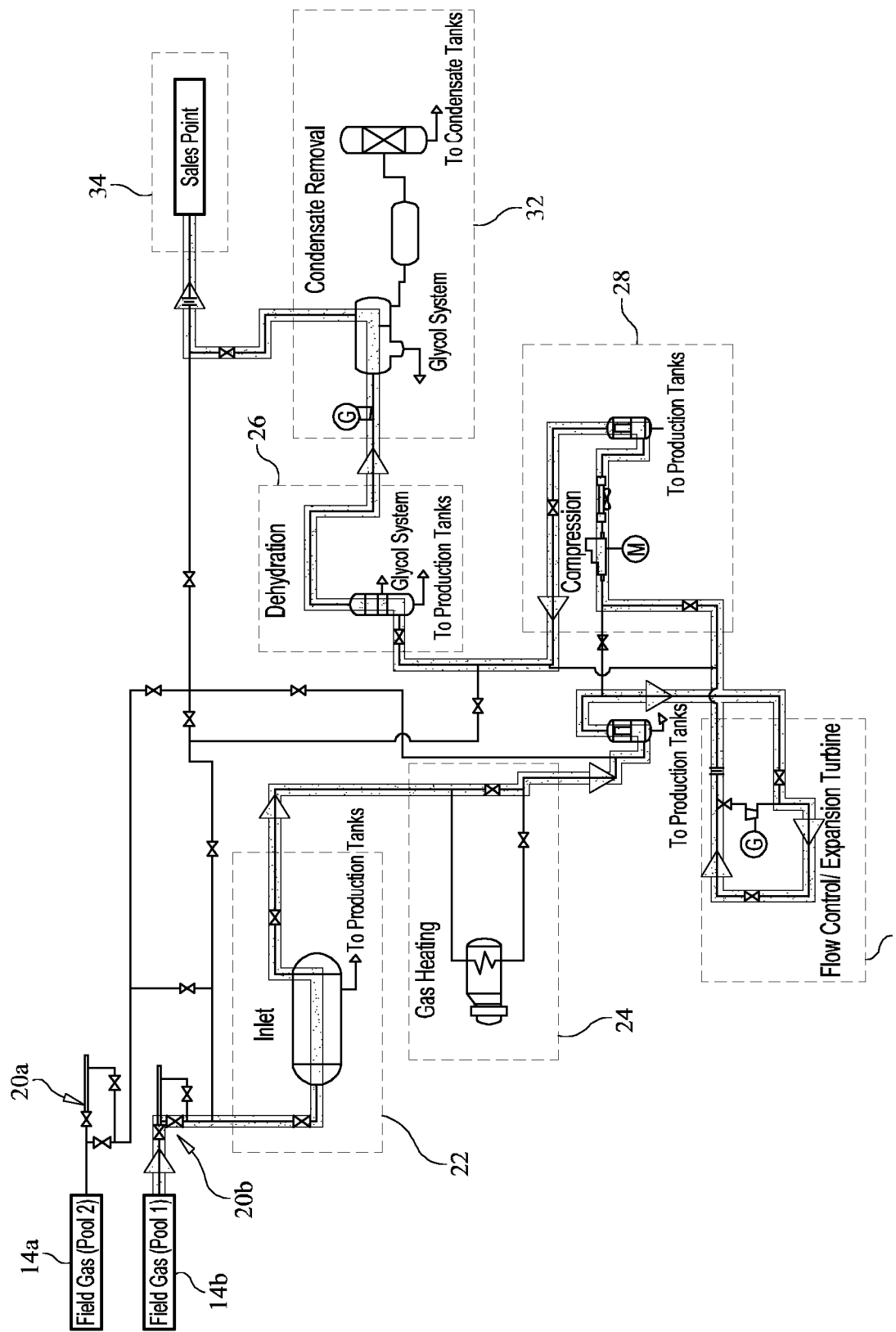
FIG. 10 is a schematic diagram showing a Compression Sales Expansion operating method in accordance with an embodiment of the invention.

In FIG. 10 a Compression Sales Expansion method of operating the system 10 is schematically shown. If the storage reservoir pressure is low but the Natural Gas price is favorable for selling, compression can be used to get the reservoir gas up to the pressure of the sales point. Because this gas is being sold it must be dehydrated and have any hydrocarbon liquids processed.

More specifically, natural gas enters the plant 12 from a formation where it is stored at a pressure below the sale point pressure, for example, from formation 14*b*. The natural gas is then flowed through the gas/liquid separation equipment 22 where the gas is processed to separate fluids from the gas. Separated gas then flows in to the compression equipment 28, bypassing the heating equipment 24 and electric generating equipment 30. The gas flows through the compression equipment 28 where it is compressed to a pressure for delivery to the sales point. After compression, the gas flows to the gas dehydration equipment 26 where the gas is dehydrated. The dehydrated gas then flows through the condensate removal equipment 32 to remove any remaining condensate with the gas before being delivered to the sales point 34.

Figure 11:
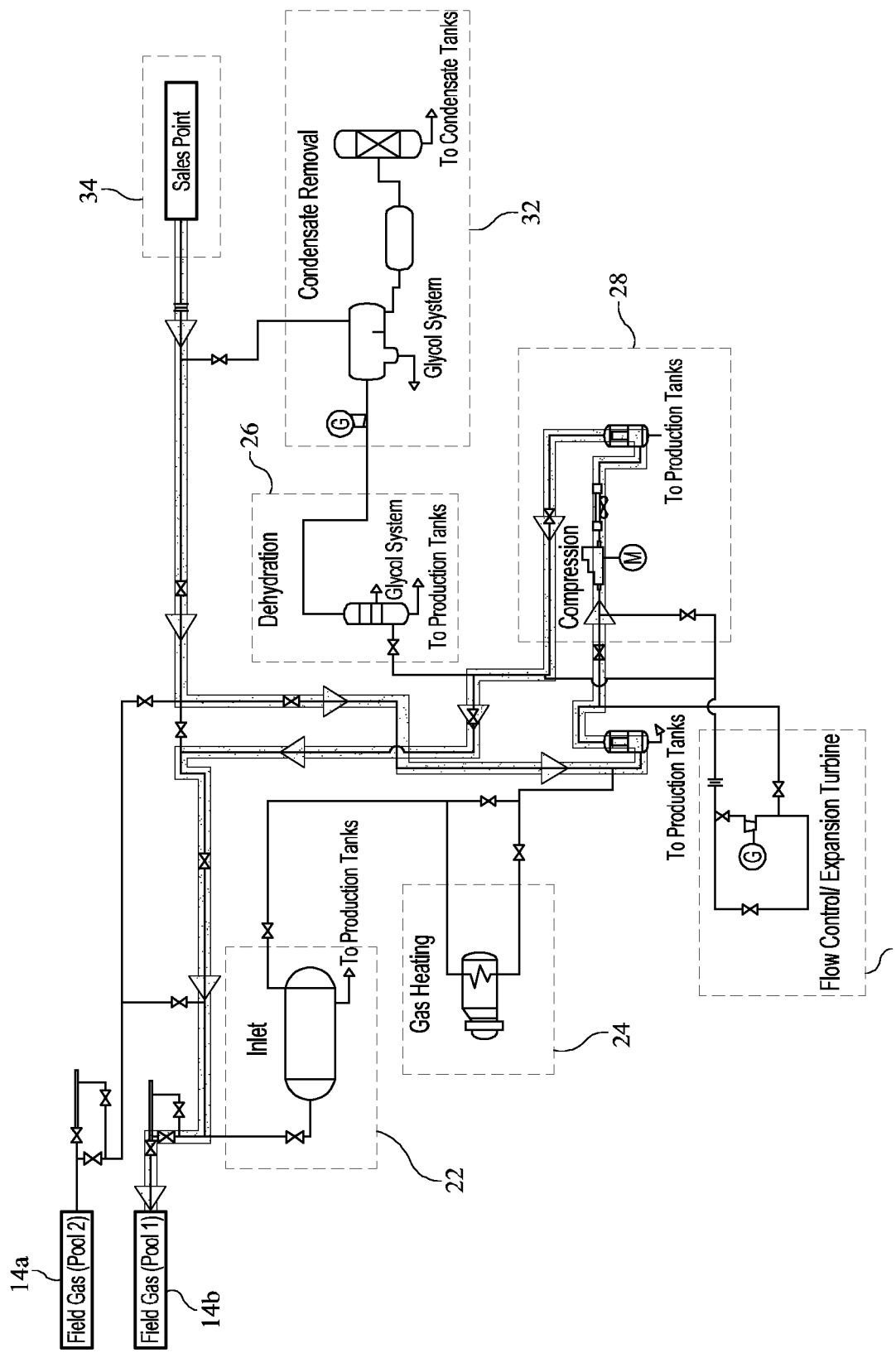
FIG. 11 is a schematic diagram showing a Purchasing Natural Gas Compression operating method in accordance with an embodiment of the invention.

In FIG. 11 a Purchasing Natural Gas Compression method of operating the system 10 is schematically shown. When Natural gas prices are favorable for purchasing this mode allows for the purchase of Natural gas from the sales point. The purchased gas will be lower pressure than the field storage, so the gas will flow through the compressors requiring power to compress it to a high enough pressure to be stored in the storage reservoir. Most of the plant process is bypassed in this mode as purchased natural gas is on specification. More specifically, natural gas enters the plant 12 from the sales point and is caused to flow to the compressor equipment 28 where the gas is compressed to a higher pressure for injection into a formation, such as, for example formation 14*b*.

Figure 12:
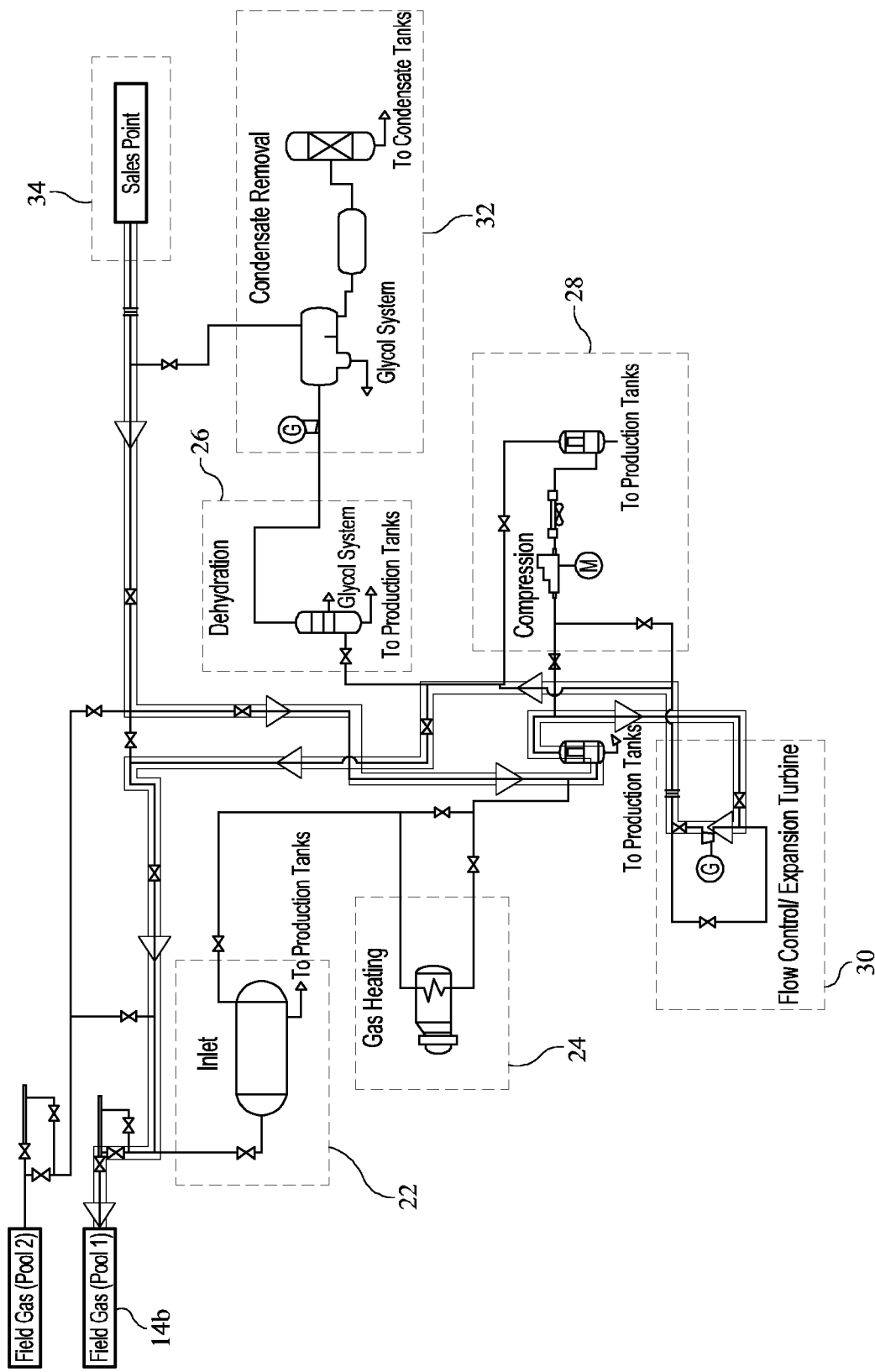
FIG. 12 is a schematic diagram showing a Purchasing Natural Gas Free Flow operating method in accordance with an embodiment of the invention.

In FIG. 12 a Purchasing Natural Gas Free Flow method of operating the system 10 is schematically shown. If Natural Gas prices are favorable for purchasing and the Storage reservoir pressure is low enough, the gas from the sales point may flow freely into the storage reservoir. Flowing the gas through the expansion turbines before sending it out to the storage reservoir may also allow for some power generation in this mode. More specifically, natural gas enters the plant 12 from the sales point and is caused to flow to the electric generating equipment 30, where the gas is expanded across the electric generator 70 to generate electricity. The gas is then caused to flow from the electric generating equipment to one or more formations, such as, for example formation 14*b*.

Figure 13:
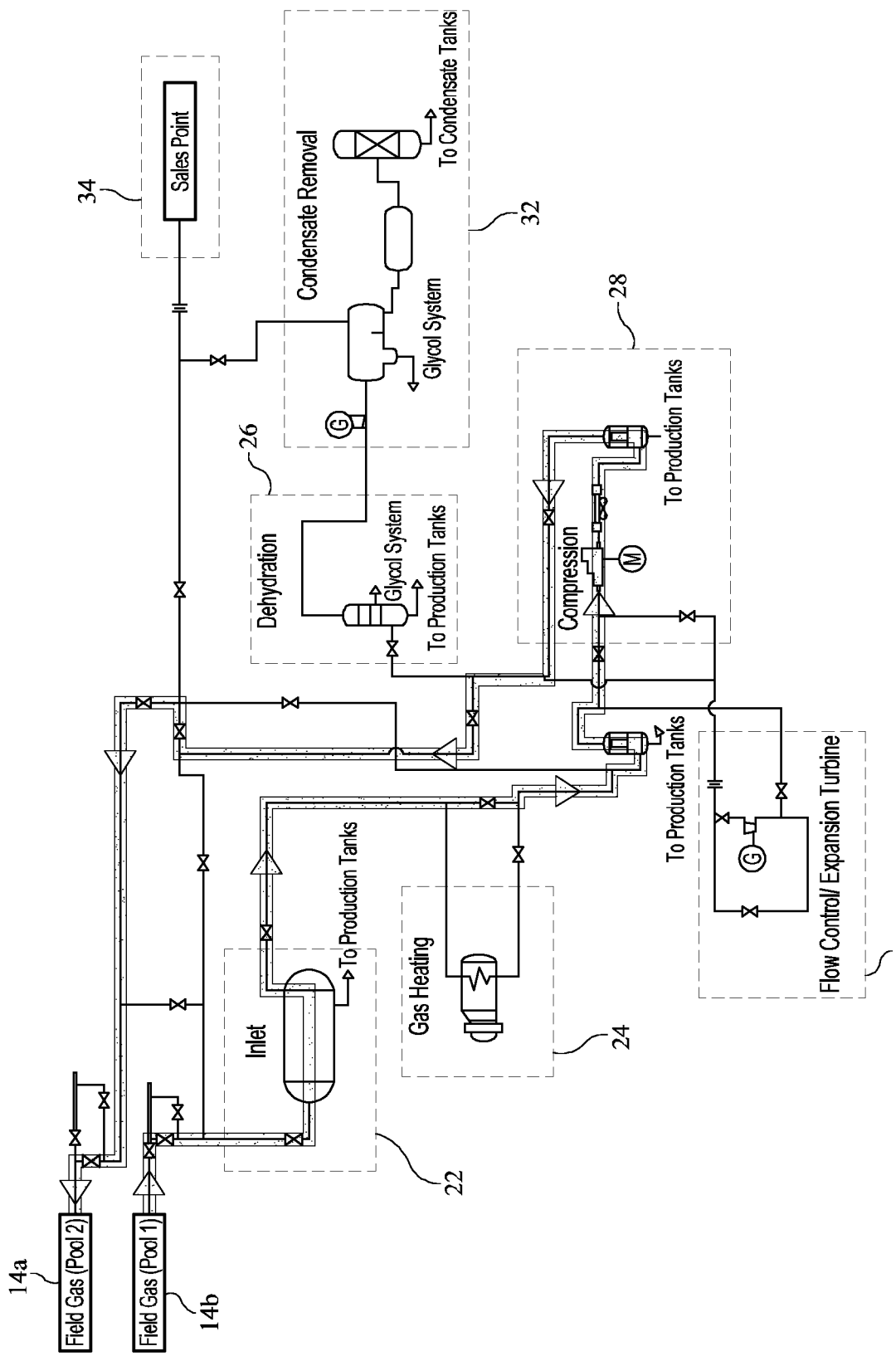
FIG. 13 is a schematic diagram showing a Compression Only operating method in accordance with an embodiment of the invention.

In FIG. 13 a Compression Only method of operating the system 10 is schematically shown. If the Natural Gas price is not favorable and the storage reservoir has multiple underground formations, the system allows for natural gas from a low-pressure pool to flow through the inlet into the compressors. After it is compressed it flows back into a high-pressure reservoir. This mode optimizes on low power prices to increase pool pressure energy stores for conversion back into electricity when peak demand hits. More specifically, natural gas enters the plant 12 from a formation, such as, for example formation 14*b* where the gas is stored at a pressure lower than the gas in another formation, such as, for example 14*a*. The received gas is flowed through the gas/liquid separation equipment 22 where the gas is processed to separate fluids from the gas. Separated gas then flows in to the compression equipment 28, bypassing the heating equipment 24 and electric generating equipment 30. The gas flows through the compression equipment 28 where it is compressed to a higher pressure for delivery to the second formation, formation 14*a* for storage.

Figure 14:
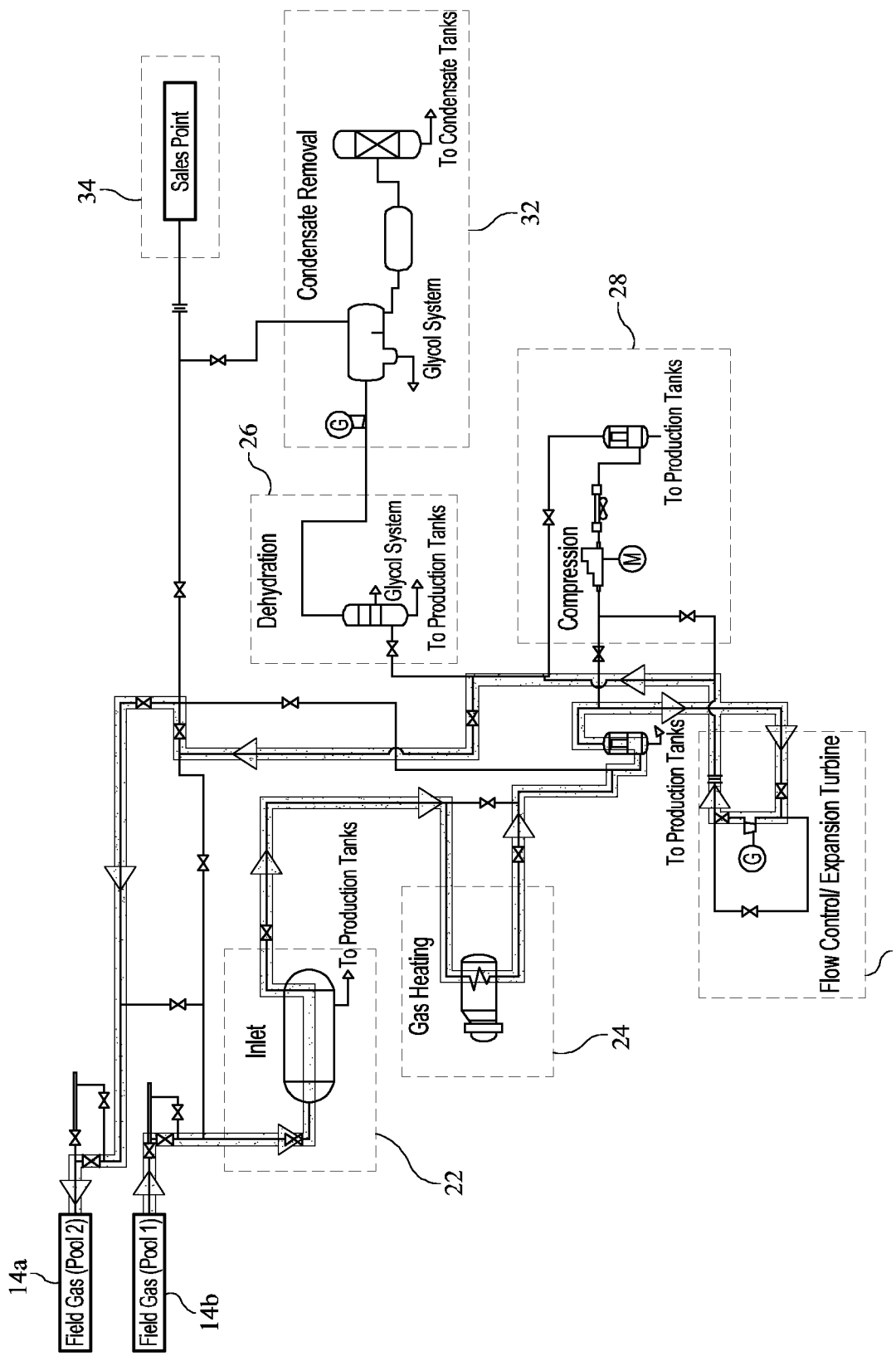
FIG. 14 is a schematic diagram showing a Power Generation operating method in accordance with an embodiment of the invention.

In FIG. 14 a Power Generation method of operating the system 10 is schematically shown. This method requires gas storage to have multiple underground formations. The gas flows from one high pressure pool through the inlet and is heated. Then the gas is expanded through the electric generator generating power and flowed back out to a lower pressure pool effectively just looping gas within the storage reservoir and not requiring the purchase or sale of natural gas. It is the primary mode used for power generation to meet peak demand. Because the natural gas is returning to storage dehydration and condensate removal is not required.

More specifically, natural gas enters the plant 12 from a formation, such as, for example formation 14*b* where the gas is stored at a pressure higher than the gas in another formation, such as, for example 14*a*. The received gas is flowed through the gas/liquid separation equipment 22 where the gas is processed to separate fluids from the gas. Separated gas then flows through the gas heating equipment 34 to heat the gas to a sufficient temperature to prevent hydrate from forming when the gas is expanded across the electric generator as it flows through the electric generating equipment 30. The sufficient temperature is a function of the initial pressure of the gas and the resulting pressure of that gas after it is processed through the electric generating equipment and known thermodynamics.

The heated gas then flows into the electrical generating equipment 30, wherein the gas pressure is reduced by expanding the gas across the electric generator 70. The electricity produced by the electric generator can be stored, used to power components of the equipment plant 12, and/or sent to a power grid for sale. After the electrical generating equipment, the gas flows into the lower pressure formation, formation 12a.

Figure 15:
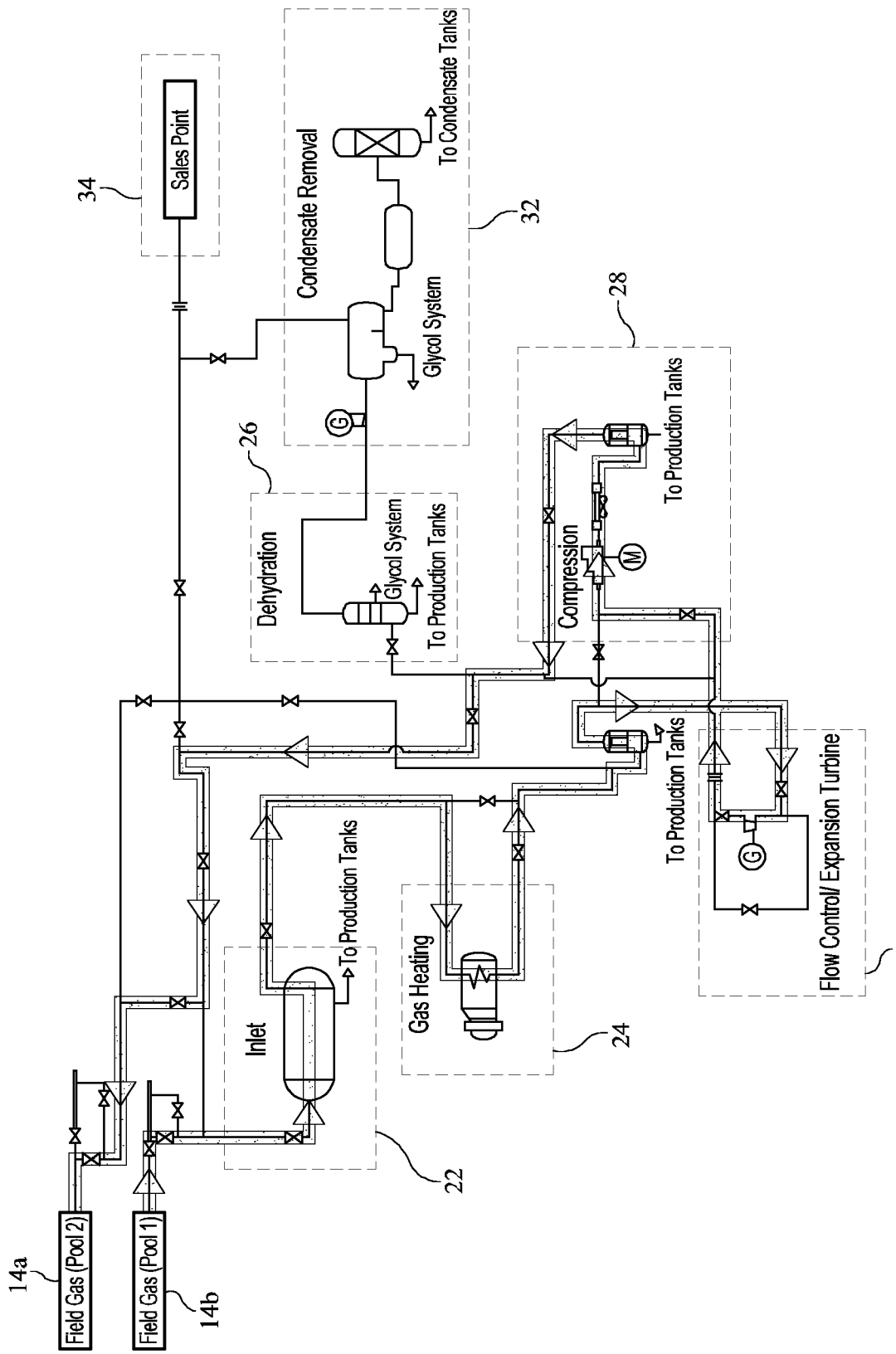
FIG. 15 is a schematic diagram showing a Power Generation and Compression operating method in accordance with an embodiment of the invention.

In FIG. 15 a Power Generation and Compression method of operating the system 10 is schematically shown. This method requires gas storage to have multiple underground formations. natural gas enters the plant 12 from a formation, such as, for example formation 14b where the gas is stored at a pressure higher than the gas in another formation, such as, for example 14a. The received gas is flowed through the gas/liquid separation equipment 22 where the gas is processed to separate fluids from the gas. Separated gas then flows through the gas heating equipment 34 to heat the gas to a sufficient temperature to prevent hydrate from forming when the gas is expanded across the electric generator as it flows through the electric generating equipment 30. The sufficient temperature is a function of the initial pressure of the gas and the resulting pressure of that gas after it is processed through the electric generating equipment and known thermodynamics.

The heated gas then flows into the electrical generating equipment 30, wherein the gas pressure is reduced by expanding the gas across the electric generator 70. The electricity produced by the electric generator can be stored, used to power components of the equipment plant 12, and/or sent to a power grid for sale. The gas then flows through the compression equipment 28 where it is compressed to a higher pressure for delivery to the second formation, formation 14a for storage.

If the compressors are natural gas fueled shutting them down for power generation mode is not required. If the facility has a heat exchanger the waste heat from the compression can be used to warm the natural gas flowing into the expansion turbines. This improves the efficiency of the system. Otherwise this is like the primary mode of electricity generation. Generating power during times of peak demand.

With multiple formations the equipment plant 12 will have a pipeline to each. Each will be a separate formation with the desired characteristics and no communication between them. They may be in different zones, or the same zone. They can be of different structure i.e. salt cavern, porous hydrocarbon formation or aquifer. The only requirement is that it is deemed suitable for natural gas storage. These formations may have multiple injections sites with multiple wells or limited to a single well. The limiting factors are the availability of formations in relative proximity to one another and the main plant, and the proximity to a sales point.

As formation composition can vary, different process requirements may be necessary at the plant and design will have to accommodate this. For example, one formation may contain H2S gas, one may be hydrocarbon rich. These formations can be run at different pressures for example one low and one high pressure. This differential between formations can be used to cycle gas through the plant for power generation, as detailed in the following configurations. It is important that piping design in the field locations and at the plant allow for multi directional gas flow, as such they should be configured accordingly.

Is also important to note geothermal energy as a resource. Gas stored underground will be warmed by the earth. The deeper the well, typically, the warmer the gas. The rate of heat energy absorption will vary depending on the formation. If gas enters the wellbores cool and is retained underground for the desired time the gas brought back to surface will be warm. As electrical energy production is dependent on temperature and pressure; if the temperature going into the storage reservoir is known (monitored) and the temperature coming out of the reservoir is also known (monitored), the energy absorbed can be calculated and factored in as a 'green energy gain' to the system. Ideally the pipelines leaving the facility would be insulated to stop heat loss to the surrounding earth (conserving energy) as much as possible. Only the deep well bores and reservoirs will add heat energy to the system.

Figure 16:
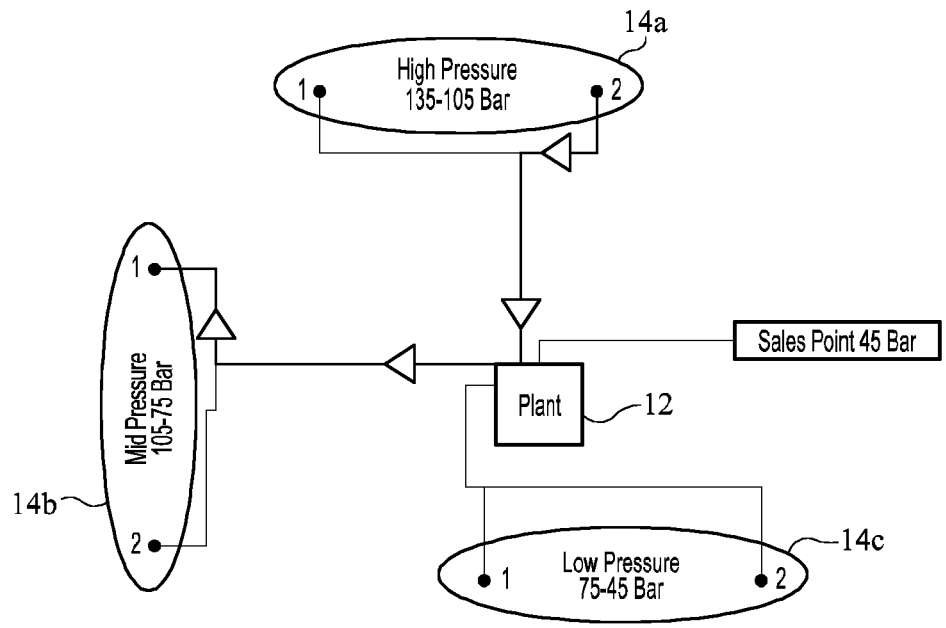
FIG. 16 is a schematic diagram of a geothermal energy absorption within a multi-formation gas storage system in accordance with an embodiment of the invention.

In FIG. 16 a geothermal energy absorption within a multi-formation gas storage system is illustrated. In this configuration the system has three underground gas storage formations 14a, 14b, and 14c. Formation 14a is high pressure, formation 14b is medium pressure and formation 14c is low pressure. There are two wells run into each formation shown at opposite sides of each. The high-pressure formation 14a is illustrated flowing to the plant 12, where it is expanded through the electric generating equipment thereby generating power and then flowing into the mid-pressure formation 14b through the first wellbore. The temperature of the gas leaving the plant is cool now that it has been expanded. This cool gas will enter formation 14b absorb the temperature of the earth becoming warmer.

Figure 17:
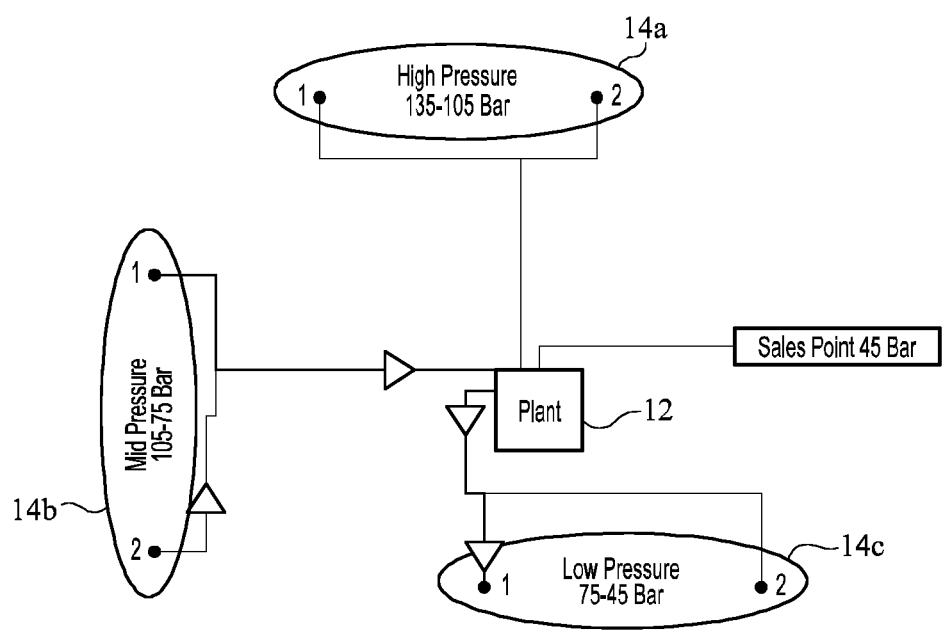
FIG. 17 is a schematic diagram of a geothermal energy absorption within a multi-formation gas storage system of FIG. 16 shown in a second operating mode, in accordance with an embodiment of the invention.

In FIG. 17, the facility is now shown with gas flowing from the second wellbore of formation 14b into the plant 12. The gas is expanded through the electric generating equipment thereby generating power. By drawing the gas out of a second wellbore, other than the first wellbore used to inject the natural gas into the formation, the gas migrating through the formation will have absorbed thermal energy of the earth. It is important to measure and record the energy gained geothermally because it is a net gained green energy. Any heat lost is something that must be added via indirect heating and other methods. Insulating piping and systems within the facility become increasingly important. Though this system shows multiple formations, even in single formations configurations any cool gas injected into a formation will gain temperature, depending on retention time. So, it can be stated that all hybrid gas storage/electrical generation systems absorb geothermal energy when operated correctly.

Several embodiments of the present invention have been described. Nevertheless, it will be understood that various modifications may be made without departing from the spirit and scope of the invention. Accordingly, other embodiments are within the scope of the following claims.

What is claimed is:

1. A method of generating electricity using natural gas stored within underground formations, the method comprising the steps of:
   providing natural gas underground storage comprising of at least three separate, nonconducting underground formations, with a first formation having a first formation pressure, a second formation having a second formation pressure, and a third formation having a third formation pressure, the first formation pressure being higher than the second formation pressure, and the second formation pressure being higher than the third formation pressure;
   recovering natural gas stored in the first underground formation forming a first natural gas flow;
   expanding the first natural gas flow across expansion turbine to generate electricity and forming a second natural gas flow having pressure lower than the pressure of the first natural gas flow;

injecting the second natural gas flow into the second underground formation through a first wellbore run therein;

recovering natural gas stored in the second underground formation through a second wellbore run therein forming a third natural gas flow;

expanding the third natural gas flow across expansion turbine to generate electricity and forming a fourth natural gas flow having pressure lower than the pressure of the third natural gas flow; and injecting the fourth natural gas flow into the third underground formation through a third wellbore run therein.

* * * * *